US012245056B2

(12) United States Patent
Rajput et al.

(10) Patent No.: US 12,245,056 B2
(45) Date of Patent: *Mar. 4, 2025

(54) METHODS, SYSTEMS, AND COMPUTER READABLE MEDIA FOR SUPPORTING CIRCUIT BREAKER DESIGN PATTERN AT CONSUMER NETWORK FUNCTION (NF)

(71) Applicant: Oracle International Corporation, Redwood Shores, CA (US)

(72) Inventors: Jay Rajput, Bangalore (IN); Virendra Singh, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/706,557

(22) Filed: Mar. 28, 2022

(65) Prior Publication Data
US 2023/0308908 A1    Sep. 28, 2023

(51) Int. Cl.
*H04W 24/04* (2009.01)
*H04L 45/00* (2022.01)
(Continued)

(52) U.S. Cl.
CPC ............. *H04W 24/04* (2013.01); *H04L 45/22* (2013.01); *H04L 67/02* (2013.01); *H04L 67/56* (2022.05)

(58) Field of Classification Search
CPC ........ H04W 24/04; H04L 67/56; H04L 45/22; H04L 67/02
See application file for complete search history.

(56) References Cited

U.S. PATENT DOCUMENTS 10,764,214 B1 *  9/2020  Plenderleith .......... H04L 41/064
11,290,549 B2    3/2022  Krishan
(Continued)

FOREIGN PATENT DOCUMENTS

CN        115243278 A  * 10/2022

OTHER PUBLICATIONS

Notice of Allowance and Fees Due for U.S. Appl. No. 17/524,711 (Aug. 24, 2023).

(Continued)

*Primary Examiner* — Jael M Ulysse
(74) *Attorney, Agent, or Firm* — Jenkins, Taylor & Hunt, P.A.

(57) ABSTRACT

A method for error information propagation from an SCP to a NF to support a circuit breaker design at the consumer NF includes receiving, at the SCP and from the consumer NF, a first SBI service request message. The method further includes attempting, by the SCP, to forward the first SBI service request to N producer NF instances. The method further includes detecting, by the SCP, an error involving the N producer NF instances. The method further includes performing, by the SCP, successful alternate routing of the first SBI service request message to an (N+1) th producer NF instance. The method further includes receiving, by the SCP, a success response message from the (N+1) th producer NF instance. The method further includes propagating, by the SCP, with the success response message and to the consumer NF, error information regarding the N producer NF instances.

20 Claims, 9 Drawing Sheets (51) Int. Cl.
*H04L 67/02* (2022.01)
*H04L 67/56* (2022.01)

(56) References Cited

U.S. PATENT DOCUMENTS

| | | | | |
|---|---|---|---|---|
| 11,831,732 | B2* | 11/2023 | Singh | H04L 69/40 |
| 2021/0092005 | A1* | 3/2021 | Kaul | H04W 24/04 |
| 2021/0306203 | A1* | 9/2021 | Landais | H04L 67/02 |
| 2022/0224589 | A1* | 7/2022 | Das | H04L 41/0627 |
| 2022/0224760 | A1 | 7/2022 | Foti et al. | |
| 2022/0330085 | A1* | 10/2022 | Li | H04L 67/565 |
| 2022/0345379 | A1* | 10/2022 | Li | H04L 67/04 |
| 2022/0393971 | A1* | 12/2022 | Bartolome Rodrigo | H04L 45/745 |
| 2023/0147549 | A1 | 5/2023 | Singh et al. | |
| 2023/0291818 | A1* | 9/2023 | Yang | H04L 67/563 |

OTHER PUBLICATIONS

Non-Final Office Action for U.S. Appl. No. 17/524,711 (Apr. 19, 2023).

Non-Final Office Action for U.S. Appl. No. 17/524,711 (Oct. 5, 2022).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1, pp. 1-78 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"Circuit Breaker Pattern," Azure Architecture Center, Microsoft Docs, pp. 1-14 (Mar. 9, 2022).

"3rd Generation Partnership Project; Technical Specification Group Services and System Aspects; System architecture for the 5G System (5GS); Stage 2 (Release 17)," 3GPP TS 23.501, V17.3.0, pp. 1-559 (Dec. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

Nygard, "Circuit Breaker," Release It!, 2nd Edition, pp. 1-3 (Jan. 30, 2018).

"3rd Generation Partnership Project; Technical Specification Group Services and System Aspects; Security architecture and procedures for 5G system (Release 18)", 3GPP TS 33.501, V18.5.0, pp. 1-330 (Mar. 2024).

"3rd Generation Partnership Project; Technical Specification Group Core Network and Terminals; 5G System; Technical Realization of Service Based Architecture; Stage 3 (Release 18)", 3GPP TS 29.500, V18.5.0, pp. 1-150 (Mar. 2024).

"3rd Generation Partnership Project; Technical Specification Group Core Network and Terminals; 5G System; Network Function Repository Services; Stage 3 (Release 18)", 3GPP TS 29.510, V18.5.0, pp. 1-382 (Dec. 2023).

"3rd Generation Partnership Project; Technical Specification Group Services and System Aspects; System architecture for the 5G System (5GS); Stage 2 (Release 18)", 3GPP TS 23.501, V18.4.0, pp. 1-706 (Dec. 2023).

"3rd Generation Partnership Project; Technical Specification Group Core Network and Terminals; 5G System; Unified Data Management Services; Stage 3 (Release 18)", 3GPP TS 29.503, V18.4.0, pp. 1-660 (Dec. 2023).

"3rd Generation Partnership Project; Technical Specification Group Core Network and Terminals; 5G System; Network Function Repository Services; Stage 3 (Release 18)", 3GPP TS 29.510, V18.4.0, pp. 1-399 (Sep. 2023).

* cited by examiner

METHODS, SYSTEMS, AND COMPUTER READABLE MEDIA FOR SUPPORTING CIRCUIT BREAKER DESIGN PATTERN AT CONSUMER NETWORK FUNCTION (NF)

TECHNICAL FIELD

The subject matter described herein relates to propagating error information between SCPs and consumer NFs. More particularly, the subject matter described herein relates to methods, systems, and computer readable media for error information propagation from an SCP to a consumer NF to support a circuit breaker design pattern at the consumer NF in networks that support indirect communication according to 3GPP communication model C.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that it may be desirable to implement a circuit breaker design pattern in the case of indirect communication according to 3GPP communication model C where the consumer NF selects the target producer NF for an initial SBI request but lacks error information to implement the circuit breaker design pattern. A circuit breaker design pattern is a concept from computer science, which is related to the operation of an electric circuit breaker, where a faulty component is bypassed by opening or breaking the circuit. It may be desirable to implement such a pattern at a consumer NF in a 5G communications network to bypass a faulty or unreachable producer NF.

For example, in the case of 3GPP indirect communication model C, when a consumer NF sends an initial service based interface (SBI) request to an SCP, the initial SBI request may specify a target NF instance in the 3gpp-Sbi-Target-apiRoot header. The SCP may route the initial SBI request to the target NF instance identified in the 3gpp-Sbi-Target-apiRoot header. If the processing of the initial SBI request is successful, the producer NF instance sends a success response to the SCP, which forwards the success response to the consumer NF.

The consumer NF may send a subsequent request to the producer NF instance to which the initial request was routed. The consumer NF may specify a routing binding indication in the subsequent request identifying the NF set of the producer NF instance. The SCP receives the request and routes the request to the same producer NF instance. If the SCP detects an error, the SCP may perform alternate routing to select another producer NF instance that is a member of the same NF set as the producer NF instance to which the initial request was routed and send the subsequent request to the newly selected producer NF instance. The newly selected producer NF instance may successfully process the request and send a success response to the SCP. The SCP sends the success response to the consumer NF. However, the consumer NF does not know about the erroneous processing of the request by the first producer NF instance. Accordingly, the consumer NF may send a subsequent initial request message identifying the producer NF instance experiencing the error as the request target, which the SCP forwards to the producer NF instance experiencing the error. Processing of the initial request may fail, which results in an error response being communicated back to the consumer NF instance, reselection by the consumer NF instance of an alternate producer NF instance, and transmitting the SBI request to the alternate producer NF instance. Such a process is inefficient and can result in service delays for consumer NFs and ultimately for end users.

Accordingly, in light of these and other difficulties, there exists a need for implementing a circuit breaker design pattern at a consumer NF instance in cases of indirect routing using 3GPP communication model C.

SUMMARY

A method for error information propagation from a service communication proxy (SCP) to a consumer network function (NF) to support a circuit breaker design at the consumer NF includes receiving, at the SCP and from the consumer NF, a first service based interface (SBI) service request message. The method further includes attempting, by the SCP, to route the first SBI service request to N producer NF instances, N being an integer of at least one. The method further includes detecting, by the SCP, an error involving the N producer NF instances. The method further includes performing, by the SCP, successful alternate routing of the first SBI service request message to an (N+1)th producer NF instance. The method further includes receiving, by the SCP, a success response message from the (N+1)th producer NF instance. The method further includes propagating, by the SCP, with the success response message and to the consumer NF, error information regarding the N producer NF instances.

According to another aspect of the subject matter described herein, the first SBI service request comprises a subsequent SBI request including a 3gpp-Sbi-Target-api-Root header identifying the first producer NF instance and a routing binding indication identifying an NF set of which the first and second producer NF instances are members.

According to another aspect of the subject matter described herein, performing successful alternate routing of the first SBI request includes selecting the (N+1)th producer NF instance from the NF set.

According to another aspect of the subject matter described herein, detecting an error involving the N producer NF instances includes receiving at least one error response from the N producer NF instances.

According to another aspect of the subject matter described herein, detecting an error regarding the N producer NF instances includes detecting a response timeout at the SCP for at least one of the N producer NF instances.

According to another aspect of the subject matter described herein, propagating the error information with the success response message includes adding a custom header including the error information to the success response message.

According to another aspect of the subject matter described herein, the error information includes information identifying each of the N producer NF instances.

According to another aspect of the subject matter described herein, the error information includes a hypertext transfer protocol (HTTP) status code generated by at least one of the N producer NF instances and transmitted to the SCP in response to the first SBI request message.

According to another aspect of the subject matter described herein, the method for error information propagation from an SCP to a NF to support a circuit breaker design at the consumer NF includes using, by the consumer NF, the error information to implement the circuit breaker design pattern.

According to another aspect of the using the error information to implement the circuit breaker design pattern includes selecting, in a manner that excludes the N producer NF instances, the (N+1)th producer NF instances as a target for a second SBI service request, generating the second SBI service request including a 3gpp-Sbi-Target-apiRoot header identifying the (N+1)th producer NF instance, and transmitting the (N+1)th SBI service request to the SCP.

According to another aspect of the subject matter described herein, a system for error information propagation from a service communication proxy (SCP) to a consumer network function (NF) to support a circuit breaker design at the consumer NF is provided. The system includes an SCP including at least one processor. The system further includes an error detector/propagator implemented by the at least one processor for receiving, from the consumer NF, a first service based interface (SBI) service request message, attempting to forward the first SBI service request messsage to a first producer NF instance, detecting an error involving the N producer NF instances, N being an integer of at least one, performing successful alternate routing of the first SBI service request message to an (N+1)th producer NF instance, receiving a success response message from the (N+1)th producer NF instance, and propagating with the success response message and to the consumer NF, error information regarding the N producer NF instances.

According to another aspect of the subject matter described herein, the first SBI service request comprises a subsequent SBI request including a 3gpp-Sbi-Target-api-Root header identifying the first producer NF instance and a routing binding indication identifying an NF set of which the first and second producer NF instances are members.

According to another aspect of the subject matter described herein, the error detector/propagator is configured to perform the successful alternate routing of the first SBI request message by selecting the (N+1)th producer NF instance from the NF set.

According to another aspect of the subject matter described herein, the error detector/propagator is configured to detect the error involving the N producer NF instances by receiving an error response from at least one of the N producer NF instance instances.

According to another aspect of the subject matter described herein, the error detector/propagator is configured to detect the error involving the first producer NF instance by detecting a response timeout at the SCP.

According to another aspect of the subject matter described herein, the error detector/propagator is configured to propagate the error information with the success response message by adding a custom header including the error information to the success response message.

According to another aspect of the subject matter described herein, the error information includes information identifying the first producer NF instance.

According to another aspect of the subject matter described herein, the error information includes a hypertext transfer protocol (HTTP) status code generated by the first producer NF instance and transmitted to the SCP in response to the first SBI request message.

According to another aspect of the subject matter described herein, the error information is usable by the consumer NF to implement the circuit breaker design pattern.

According to another aspect of the subject matter described herein, a non-transitory computer readable medium having stored thereon executable instructions that when executed by a processor of a computer control the computer to perform steps is provided. The steps include receiving, at a service communication proxy (SCP) and from a consumer network function (NF), a first service based interface (SBI) service request message. The steps further include attempting, by the SCP, to forward the first SBI service request to a N producer NF instances, N being an integer of at least one. The steps further include detecting, by the SCP, an error involving the N producer NF instances. The steps further include performing, by the SCP, successful alternate routing of the first SBI service request message to an (N+1) th producer NF instance. The steps further include receiving, by the SCP, a success response message from the (N+1) th producer NF instance. The steps further include propagating, by the SCP, with the success response message and to the consumer NF, error information regarding the N producer NF instances.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
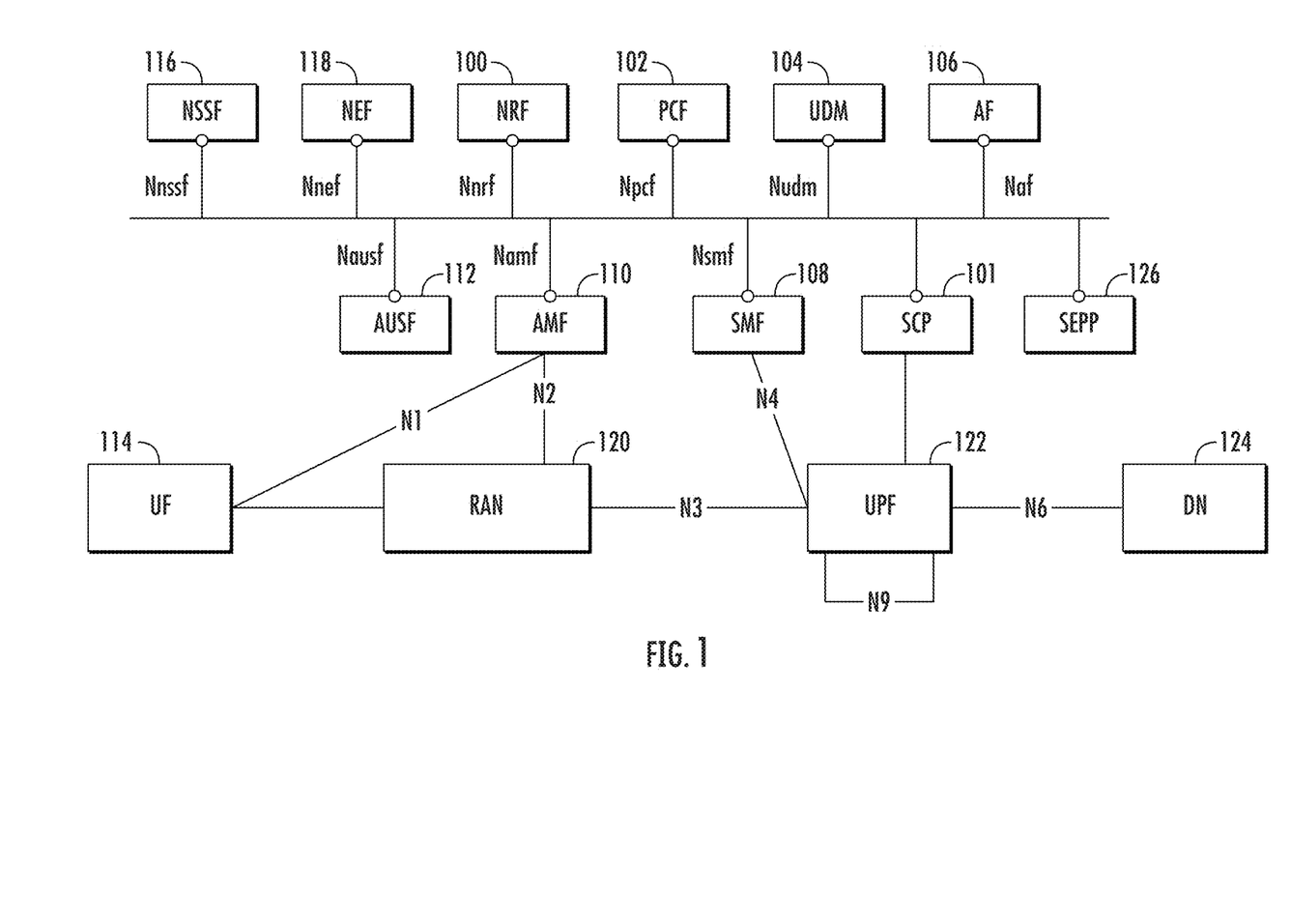
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
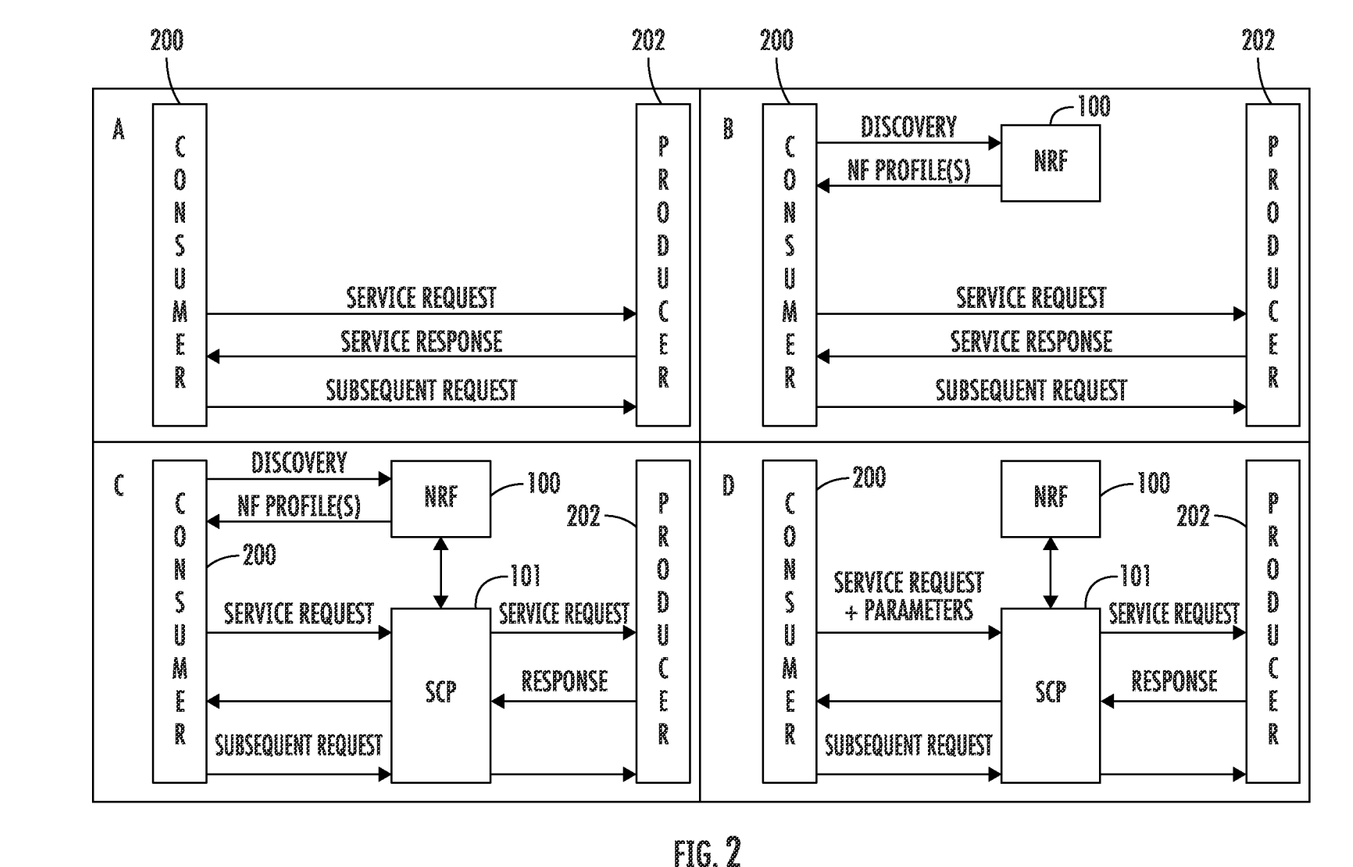
FIG. 2 is a network diagram illustrating 3GPP SBI communication models.

As stated above, one problem that can occur in 5G and other networks is that the circuit breaker design pattern cannot be implemented at a consumer NF in the case of indirect communication using 3GPP communication model C. FIG. 2 is a network diagram illustrating 3GPP communication models A-D. In FIG. 2, the upper left quadrant represents communication model A where a consumer NF 200 sends service requests directly to a producer NF 202.

There is no intermediate SCP or discovery of NF profiles. The consumer NF is configured with the profiles of the producer NFs with which the consumer NF communicates.

The upper right quadrant in FIG. 2 illustrates communication model B. In communication model B, consumer NF 200 discovers NF profiles from NRF 100 and uses the NF profiles to directly contact and communicate with producer NFs, such as producer NF 202.

The lower left quadrant in FIG. 2 is 3GPP communication model C, which is referred to as indirect communication without delegated discovery. It is this model to which the subject matter described herein is directed. In model C, consumer NFs, such as consumer NF 200, perform discovery by querying NRF 100 and receiving NF profiles. Based on the discovery response, the consumer NF selects an NF set or a specific NF instance of the NF set to which initial requests are routed. Consumer NF 200 then sends the initial request to SCP 101. The request includes the address of the selected service producer pointing to an NF service instance or a set of NF service instances. In the case where the initial request specifies a set of NF instances, SCP 101 selects the NF service instance. If possible, SCP 101 interacts with NRF 100 to obtain selection parameters, such as locality capacity, etc. SCP 101 routes the request to the selected NF service producer instance 202.

The lower right quadrant in FIG. 2 illustrates 3GPP communication model D, which is referred to as indirect communication with delegated discovery. In indirect communication with delegated discovery, consumer NFs do not do any discovery or producer NF selection. Consumer NF 200 delegates discovery and service selection to SCP 101. Consumer NF 200 adds discovery and selection parameters to find a suitable producer to serve a request. SCP 101 uses the request address and the discovery selection parameters in the request message to route the request to a producer NF instance, such as producer NF instance 202. SCP 101 also performs discovery with NRF 100 to obtain NF profiles.

As stated above, it may be desirable to implement a circuit breaker design pattern at the consumer NF for indirect communication without delegated discovery according to 3GPP communication model C. The circuit breaker design pattern, popularized by Michael Nygard in his book, Release It!, can prevent an application from repeatedly trying to execute an operation that is likely to fail. The circuit breaker design pattern allows operation of the application to continue without waiting for the fault to be fixed or wasting CPU cycles while the application determines that the fault is long lasting. The circuit breaker design pattern also enables the application to detect whether the fault has been resolved. If the problem appears to have been fixed, the application can try to invoke the operation.

Figure 3:
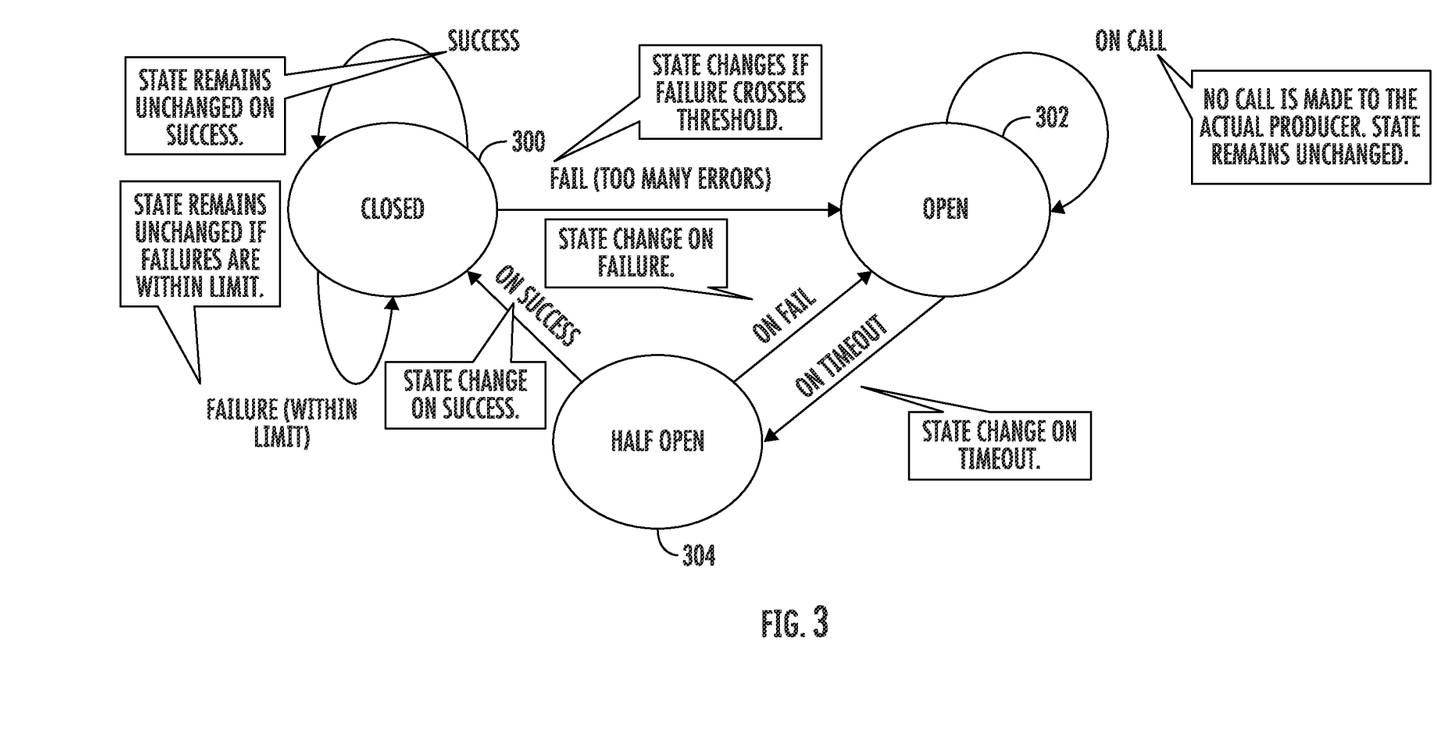
FIG. 3 is a state diagram illustrating states for implementing a circuit breaker design pattern.

FIG. 3 is a state diagram illustrating states for implementing a circuit breaker design pattern. Referring to FIG. 3, the circuit breaker design pattern includes a closed state 300, a half-open state 302, and an open state 304. In closed state 300, the producer NF or other system remains accessible. If the producer NF or other system experiences too many failures, the system transitions from closed state 300 to open state 304. In open state 304, the producer NF or other failed system is inaccessible. In open state 304, if a state change timeout occurs, the system transitions to half-open state 302. In half-open state 302, if a failure occurs, the system transitions to open state 304. If a success occurs, the system transitions to closed state 300.

Figure 4:
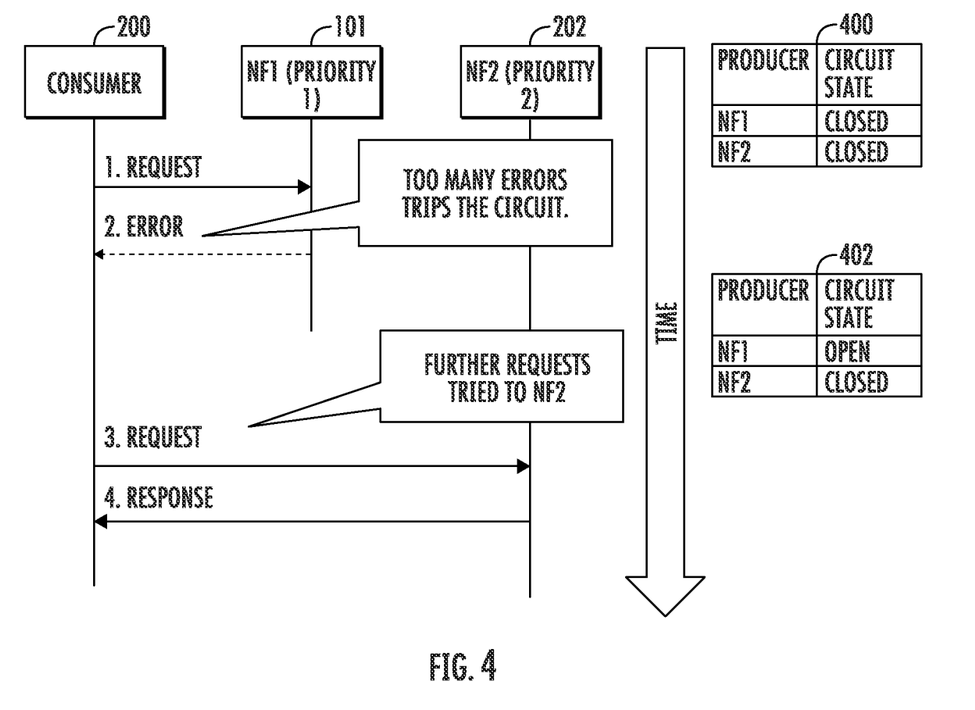
FIG. 4 is a message flow diagram illustrating exemplary messages exchanged for implementing a circuit breaker design pattern for 3GPP communication model A or model B.

It is desirable to implement a circuit breaker design pattern, such as that illustrated in FIG. 3, at a consumer network function to bypass unavailable producer network functions. However, in cases of indirect routing using 3GPP communication model C, a circuit breaker design pattern may not be possible in some instances because the consumer NF lacks error information regarding the producer NF instance operational status FIG. 4 is a message flow diagram illustrating exemplary messages exchanged for implementing a circuit breaker design pattern for 3GPP communication model A or model B. In line 1 of FIG. 4, consumer NF 200 sends a request directly to producer NF 202. In line 2, producer NF 202 either responds with an error, or consumer NF 200 detects a timeout event. Because consumer NF 200 is communicating directly with producer NF 202, consumer NF 200 has access to error information regarding producer NF 202. Accordingly, consumer NF 200 can implement a circuit breaker design pattern by opening the circuit to bypass producer NF 202. For example, as illustrated in line 3, consumer NF 200 sends the request to producer NF 204, and, in line 4, producer NF 204 responds with a success response. Tables 400 and 402 on the right hand side of FIG. 4 show the circuit state prior to and after consumer NF 200 detects an error regarding producer NF 202. When consumer NF 200 determines that producer NFs 202 and 204 are in an operational state, the circuit is closed, meaning that consumer NF 200 can communicate with both producer NF 202 and producer NF 204. When consumer NF 200 detects an error regarding producer NF 202, the circuit state for producer NF 202 changes to open.

Figure 5:
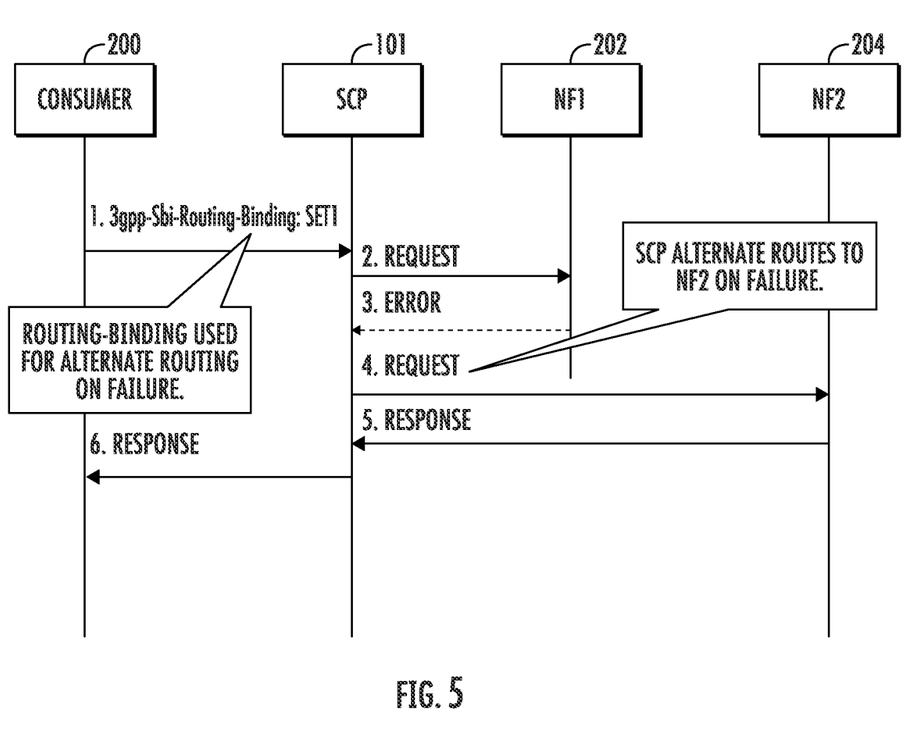
FIG. 5 is a message flow diagram illustrating exemplary messages exchanged when an SBI request from a consumer NF includes a routing binding indication.

FIG. 5 is a message flow diagram illustrating exemplary messages exchanged when an SBI request from a consumer NF includes a routing binding indication. As per 3GPP TS 29.500, a routing binding indication conveys binding information to direct a request from a client to a server which has the context. A routing binding indication shall only be contained in an HTTP request. The SCP uses the routing binding indication to perform alternate routing if needed. It should be noted that the routing binding indication is applicable only to subsequent requests after a resource on the target producer NF instance is created in response to an initial request. There is no routing binding for initial requests when the resource is yet to be created.

Referring to the message flow in FIG. 5, in line 1, consumer NF 200 sends an SBI request message to SCP 101. The SBI request includes a routing binding indication identifying Set1 of which producer NFs 202 and 204 are members. In line 2, SCP 101 selects producer NF 202 to process the initial request. In line 3, SCP 101 detects an error in processing of the initial request. Accordingly, in line 4, SCP 101 performs alternate routing and sends the request to producer NF 204. In line 5, producer NF 204 responds with a success response. In line 6, SCP 101 forwards the success response to consumer NF 200.

Figure 6:
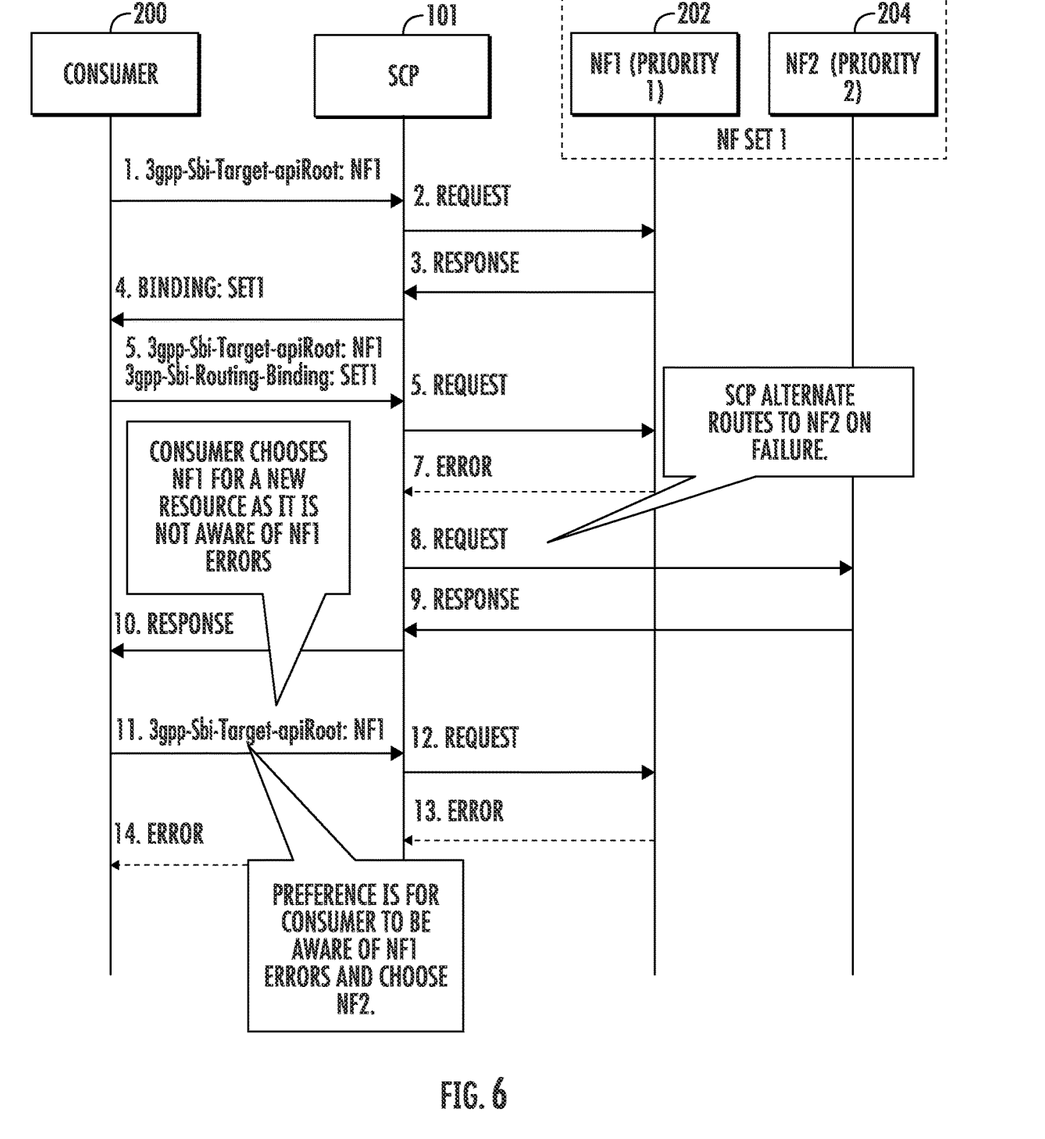
FIG. 6 is a message flow diagram illustrating exemplary messages exchanged in 3GPP communication model C when a consumer NF lacks error information for implementing a circuit breaker design pattern.

FIG. 6 is a message flow diagram illustrating exemplary messages exchanged in 3GPP communication model C when a consumer NF lacks error information for implementing a circuit breaker design pattern. Model C indirect communication does not provide error information to the consumer NF. Absent knowledge of errors generated by a producer NF, the consumer NF can select a higher priority unhealthy producer NF, rather than a lower priority healthy producer NF. Even though the NRF provides active NF health status, a passive health status calculated from the failures generated by the producer NF may be a better qualifier and is used for circuit breaker design pattern implementation described herein. There is a need in model C for the consumer NF to implement the circuit breaker design pattern to stop sending new requests to an unhealthy producer NF.

Referring to the message flow in FIG. 6, in line 1, consumer NF 200 sends an initial SBI request to SCP 101. As used herein, the term "initial SBI request" refers to the first request in an SBI transaction and requests the creation of a resource on the target producer NF instance. The initial SBI request identifies NF1 202 in the 3gpp-Sbi-Target-apiRoot header. In line 2, SCP 101 sends the initial SBI request to NF1 202. In line 3, NF1 202 responds with a success response. In line 4, SCP 101 forwards the success response to consumer NF 200.

In line 5 of the message flow diagram, consumer NF 200 sends a subsequent SBI request to SCP 101. As used herein, the term "subsequent SBI request" is an SBI request that is directed to a producer NF instance for which a resource has already been created in response to an initial SBI request. The subsequent SBI request identifies NF1 202 in the 3gpp-Sbi-Target-apiRoot header and identifies Set1 in the routing binding indication parameter. In line 6, SCP 101 sends the SBI request to NF1 202. In line 7, NF1 202 experiences an error which is detected by SCP 101. In line 8, SCP 101 performs alternate routing and selects NF2 204 to process the request and sends the request to NF2 204. In line 9, SCP 101 receives a response from NF2 204 indicating that the request was successfully processed. In line 10, SCP 101 forwards the success response to consumer NF 200.

At line 10, consumer NF 200 does not know of the error involving produces NF 202. Accordingly, in line 11, consumer NF 200 sends an initial request to SCP 101 identifying NF1 202 in the 3gpp-Sbi-Target-apiRoot header. In line 12, SCP 101 forwards the request to NF1 202. In line 13, SCP 101 detects an error and in line 14 informs consumer NF 200 of the error. Because consumer NF 200 lacks, prior to selecting producer NF 202 in line 11, the error information regarding producer NF 202, the unnecessary signaling and delay associated with the messages in lines 11 through 14 cannot be avoided.

Figure 7:
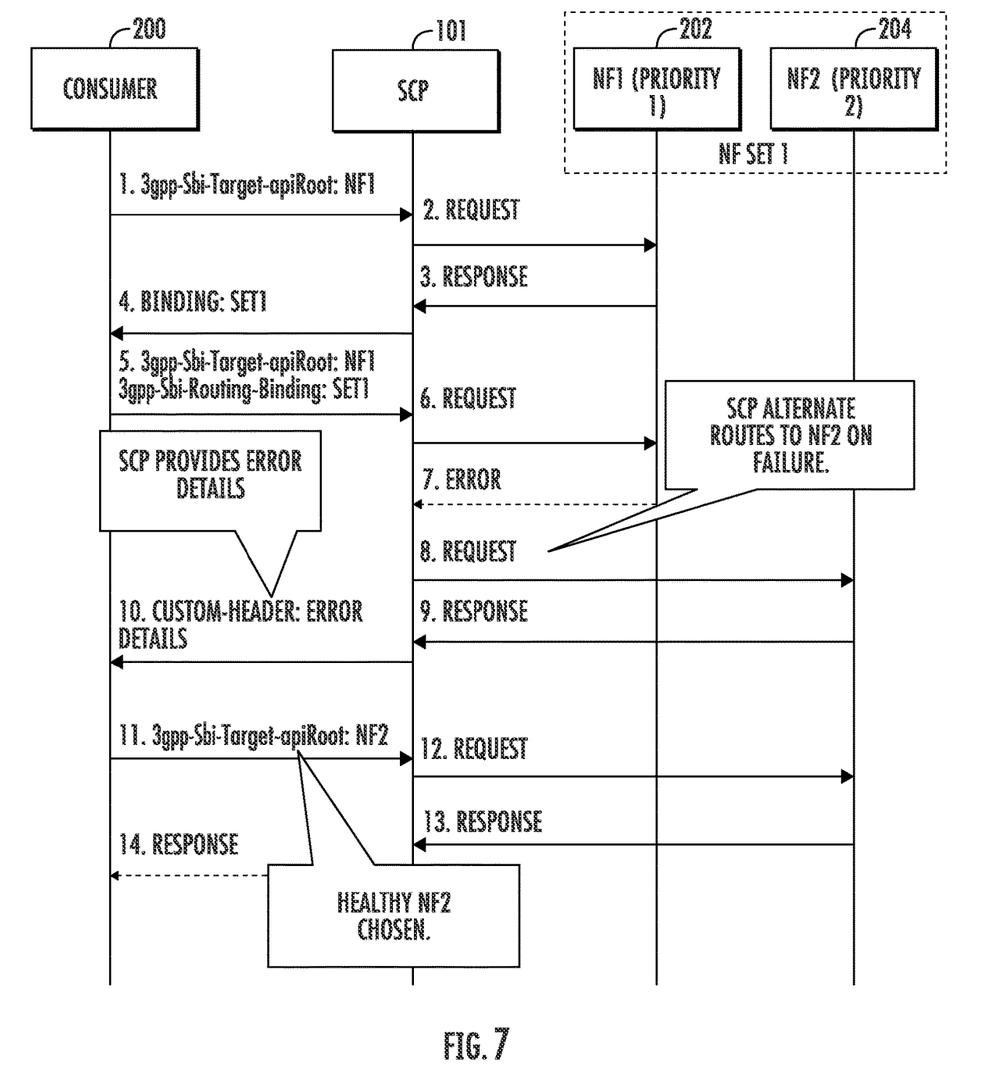
FIG. 7 is a message flow diagram illustrating exemplary messages exchanged where the SCP propagates error information to the consumer NF and the consumer NF uses the error information to implement a circuit breaker design pattern.

FIG. 7 is a message flow diagram illustrating exemplary messages exchanged where the SCP propagates error information to the consumer NF, and the consumer NF uses the error information to implement a circuit breaker design pattern. In the implementation described herein, the SCP propagates error details back to the consumer NF with a success response message from one producer NF after the SCP has received or detected error details regarding producer NF instance(s) to which an SBI request message was routed and the routing attempt failed. Error details are explained in more detail below. The error details may be generated by the SCP or returned by the producer NF experiencing the error. The error details returned are not same as the details provided by the overload control information (OCI) and load control information (LCI) header. OCI/LCI indicates the load and congestion status of the producer NF. Multiple of such headers may be present. The error details header transmitted by the SCP to the consumer NF herein includes information identifying each producer NF for which the error was detected and, if available, details concerning the error, such as the HTTP status code returned by each producer NF instance. The consumer NF utilizes the error details propagated by the SCP to perform/implement a circuit breaker design pattern that avoids routing to the failed producer NF instances.

Referring to the message flow in FIG. 7, in line 1, consumer NF 200 sends an initial SBI request to SCP 101. The initial SBI request identifies producer NF1 202 in the 3gpp-Sbi-Target-apiRoot header. In line 2, SCP 101 forwards the initial SBI request to producer NF1 202. In line 3, producer NF1 202 responds with a success response. In line 4, SCP 101 forwards the success response to consumer NF 200.

In line 5 of the message flow diagram, consumer NF 200 sends a subsequent SBI request to SCP 101. The subsequent SBI request identifies producer NF1 202 in the 3gpp-Sbi-Target-apiRoot header and identifies Set1 in the routing binding indication parameter. In line 6, SCP 101 sends the SBI request to producer NF1 202. In line 7, SCP 101 detects an error concerning producer NF 202. In line 8, SCP 101 performs alternate routing and selects producer NF2 204 to process the request and sends the request to producer NF2 204. In line 9, SCP 101 receives a response from producer NF2 204 indicating that the request was successfully processed.

In line 10, SCP 101 forwards the success response to consumer NF 500. However, rather than just sending a copy of the success response received from producer NF2 204, SCP 101 adds a custom header to the success response including error details identifying producer NF 202 as a producer NF instance that has experienced an error and, if available, error details. After line 10, consumer NF 200 has sufficient information to implement a circuit breaker design pattern bypassing producer NF2 202 for new initial requests.

In line 11 of the message flow diagram, consumer NF 200 sends an initial request to SCP 101. The initial request identifies producer NF2 204 as the target of the initial request. In line 12, SCP 101 sends the initial request to target NF2 204. In line 13, target NF2 204 sends a success response to SCP 101. In line 14, SCP 101 sends the success response to consumer NF 200. Accordingly, unlike the scenario illustrated in FIG. 6, consumer NF 200 bypasses the faulty producer NF 202 without first sending the initial request to faulty producer NF 202 and thereby implements a circuit breaker design pattern.

In one example, SCP 101 may formulate the error details custom header to include in the success response message using the parameters illustrated in Table 1.

TABLE 1

Attributes of Error Details Custom Header

| Attribute | Description |
| --- | --- |
| NF Instance ID | NF instance ID of producer NF instance for which error was detected |
| NF Service Instance ID | NF service instance ID of producer NF service instance for which error was detected |
| HTTP Status code | HTTP status code returned by producer NF instance experiencing error (if available) |
| IP Endpoint | IP address and port details of producer NF Instance experiencing error. |

As illustrated in Table 1, the error details custom header includes attributes or parameters that identify the producer NF instance and service instance experiencing the error as well as the HTTP status code, if available. The HTTP status code may be available if the producer NF instance responds with an error response including a 4xx or 5xx error status code. However, if an error is detected due to a timeout, the HTTP status code may not be available. It should be noted that in the case of multiple routing failures for the same SBI request, the error details custom header may contain the information above in Table 1 for each producer NF instance for which a routing failure was detected.

Figure 8:
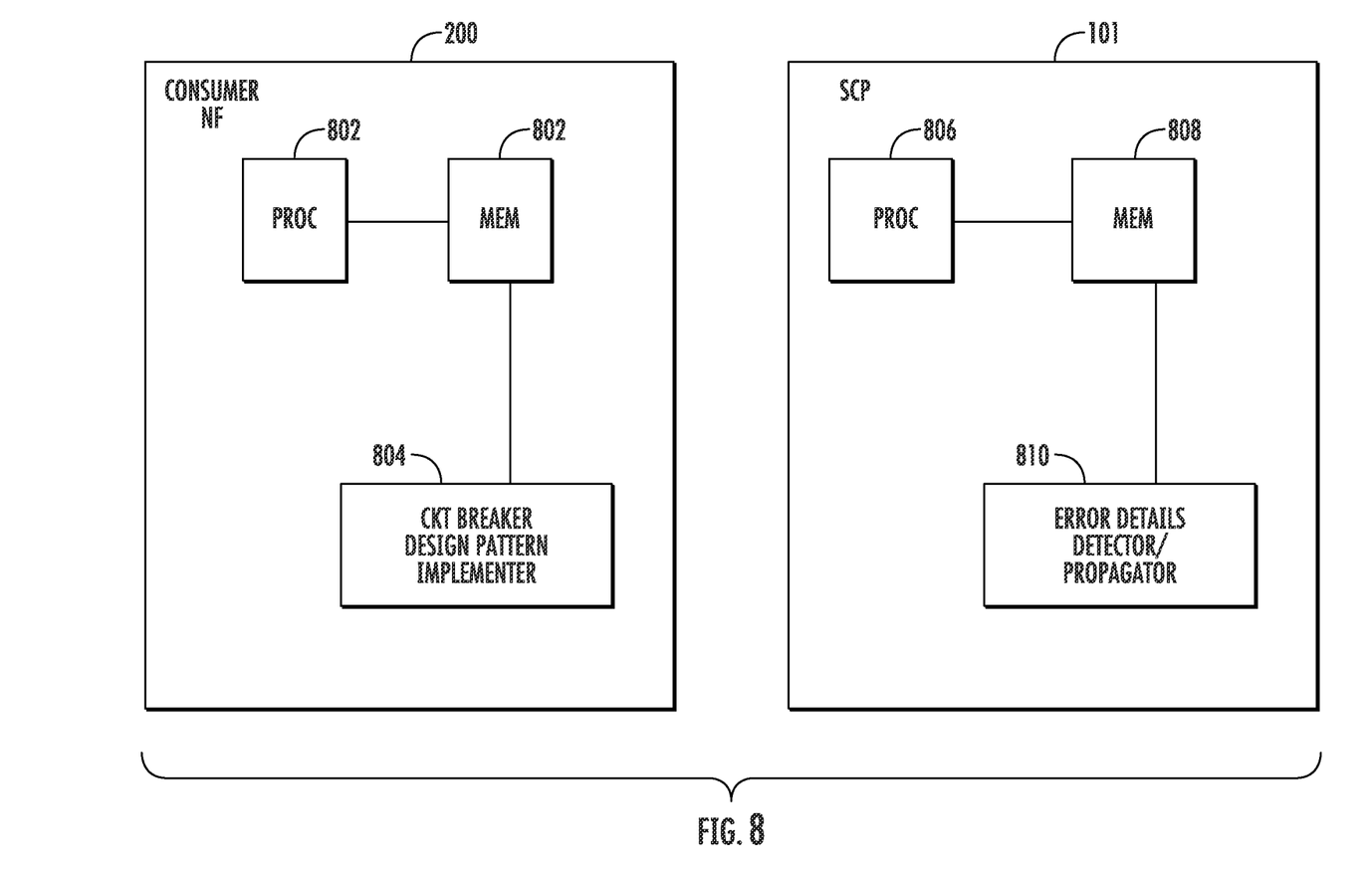
FIG. 8 is a block diagram illustrating exemplary architectures for a consumer NF and an SCP for error information propagation and implementing a circuit breaker design at the consumer NF.

FIG. 8 is a block diagram illustrating exemplary architectures for a consumer NF and an SCP for error information propagation and implementing a circuit breaker design at the consumer NF. Referring to FIG. 8, consumer NF 200 includes at least one processor 800 and memory 802. Consumer NF 200 also includes a circuit breaker design pattern implementer 804 that implements a circuit breaker design pattern to bypass producer NF instances that are experiencing errors based on error details received from SCP 101 in the custom header described above with regard to FIG. 7 and Table 1. Circuit breaker design pattern implementer 804 may be implemented using computer executable instructions stored in memory 802 and executed by processor 800. SCP 101 also includes at least one processor 806 and memory 808. SCP 101 further includes an error details detector/propagator 810 that detects error conditions regarding producer NF instances and propagates the error details to consumer NFs using the error details custom header described above with regard to FIG. 7 and Table 1. Error details detector/propagator 810 may be implemented using computer executable instructions stored in memory 808 and executed by processor 806.

Figure 9:
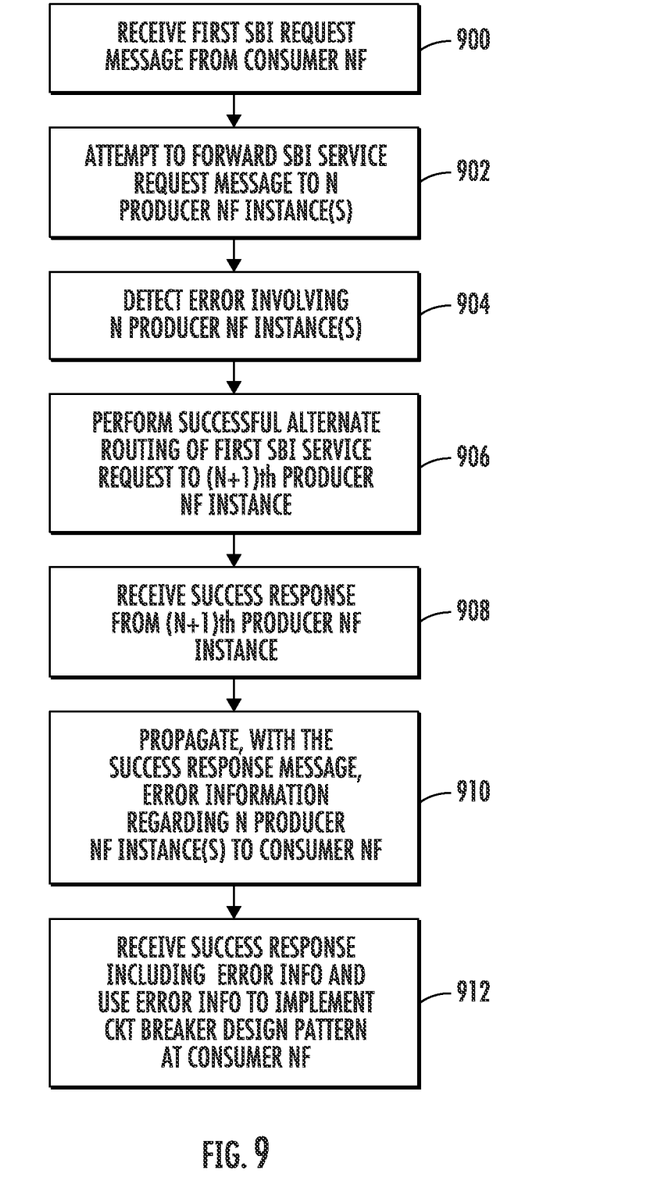
FIG. 9 is a flow chart illustrating an exemplary process for error information propagation by an SCP to a consumer NF to support a circuit breaker design pattern at the consumer NF.

FIG. 9 is a flow chart illustrating an exemplary process for error information propagation by an SCP to a consumer NF to support the circuit breaker design pattern at the consumer NF. Referring to FIG. 9, in step 900, the process includes receiving, at the SCP and from the consumer NF, a first service based interface (SBI) service request message. In one example, SCP 101 may receive an initial request or a subsequent request from a consumer NF instance. The SBI request may include a 3gpp-Sbi-Target-apiRoot header identifying a producer NF instance to which the request should be forwarded.

In step 902, the process includes attempting, by the SCP, to forward the first SBI service request message to N producer NF instances, N being an integer of at least one. Continuing with the example in step 900 where the request message is a subsequent request message including a 3gpp-Sbi-Target-apiRoot header, the SCP may attempt to forward the subsequent SBI request message to the producer NF instance identified by the value of the 3gpp-Sbi-Target-apiRoot header, which is the producer NF instance on which the resource for the SBI transaction was previously created. If an error message is received from the producer NF instance or if a response timeout occurs, the SCP may successively attempt to forward the SBI request message to producer NF instances that are in the same NF set as the producer NF instance identified in the 3gpp-Sbi-Target-apiRoot header.

In step 904, the process includes detecting, by the SCP, an error involving the N producer NF instances. For example, the SCP may receive error responses from one or more of the producer NF instances with an HTTP status code identifying error details. In another example, the SCP may fail to receive a response from one or more of the producer NF instances within a response timeout period and may determine, based on the response timeout, that an error involving the N producer NF instances has occurred.

In step 906, the process includes performing, by the SCP, successful alternate routing of the first SBI service request message to an (N+1)th producer NF instance. For example, in response to detecting an error in a previous routing or forwarding attempt, the SCP may select an alternate producer NF instance to process the first SBI service request. In one example, the SCP may select the alternate producer NF instance by reading the NF set identifier from the routing binding indication in the first SBI request and selecting the alternate producer NF instance from the producer NF instance that are in the same NF set as the producer NF instance(s) experiencing the error. Once an alternate producer NF instance is selected, the SCP may forward the first SBI request message to the alternate producer NF instance.

In step 908, the process includes receiving, by the SCP, a success response from the (N+1)th producer NF instance. For example, the SCP may receive a success response from (N+1)th producer NF instance to which the first SBI request was routed using the alternate routing after errors by the N producer NF instances. The success response message may indicate that the first SBI request was successfully processed.

In step 910, the process includes propagating, with the success response message, error information regarding the N producer NF instances to the consumer NF. For example, the SCP may formulate the error details custom header described above with regarding to FIG. 7 and Table 1, add the error details custom header to the success response message received from the (N+1)th producer NF instance, and transmit the error details custom header to the consumer NF. The error details custom header may include error information identifying each producer NF instance for which routing of the first SBI request was attempted and failure was detected. Thus, if errors involving multiple NF instances were detected, the error details custom header may include error information identifying multiple NF instances.

In step 912, the process includes, at the consumer NF, receiving the success response message and using the error information to implement a circuit breaker design pattern bypassing the first producer NF instance. For example, the consumer NF may receive the success response, mark the producer NF instances identified in the error details custom header as unavailable, and, when sending a new initial request needing a service provided by the first producer NF instance, select an alternate producer NF instance in the same NF set as N first producer NF instance marked as unavailable. The consumer NF may then forward the new initial request message to the alternate producer NF instance.

Exemplary advantages of the subject matter described herein include that it enables consumer NFs to implement the circuit breaker design pattern, which improves performance and reduces latency for 3GPP indirect communication model C. Passively propagating producer NF error information to the consumer NF in 3GPP communications model C enables to consumer to make better routing decisions by preferring healthy lower priority producer NFs over unhealthy higher priority producer NFs. Another advantage of the subject matter described herein is that the error information propagated to the consumer NF instance can used across SBI transactions. That is, when consumer NF receives the custom header including error details in a success response for one transaction in which a producer NF was identified as experiencing an error, the consumer NF may use the error details to exclude the producer NF instance from producer NF selection for an initial request for a new SBI transaction. Implementing the error detection and propagation at the SCP also provides a benefit in terms of network efficiency as the SCP can propagate the error information to plural consumer NFs that use the SCP for indirect routing according to 3GPP communications model C.

The disclosure of each of the following references is hereby incorporated herein by reference in its entirety.

REFERENCES 1. 3$^{rd}$ Generation Partnership Project; Technical Specification Group Core Network and Terminals; 5G System; Technical Realization of the Service Based Architecture; Stage 3 (Release 17) 3GPP TS 29.500 V17.5.0 (2021-12)
2. 3$^{rd}$ Generation Partnership Project; Technical Specification Group Services and System Aspects; 5G System; System Architecture for the 5G System (5GS); Stage 2 (Release 17) 3GPP TS 23.501 V17.3.0 (2021-12)
3. 3$^{rd}$ Generation Partnership Project; Technical Specification Group Services and System Aspects; 5G System; Procedures for the 5G System (5GS); Stage 2 (Release 17) 3GPP TS 23.502 V17.3.0 (2021-12)
4. Circuit Breaker Pattern, https://docs.microsoft.com/en-us/azure/architecture/patterns/circuit-breaker (Nov. 8, 2021).
5. Nygard, Michael, Release It!, https://learning.oreilly.com/library/view/release-it-2nd/9781680504552/f_0049.xhtml#stability-patterns.circuit-breaker (January 2018)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for error information propagation from a service communication proxy (SCP) to a consumer network function (NF) to support a circuit breaker design at the consumer NF, the method comprising:
   receiving, at the SCP and from the consumer NF, a first service based interface (SBI) service request message;
   attempting, by the SCP, to forward the first SBI service request to N producer NF instances, N being an integer of at least one;
   detecting, by the SCP, an error involving the N producer NF instances;
   performing, by the SCP, successful alternate routing of the first SBI service request message to an (N+1) th producer NF instance;
   receiving, by the SCP, a success response message from the (N+1) th producer NF instance; and
   propagating, by the SCP, with the success response message and to the consumer NF, error information regarding the N producer NF instances.

2. The method of claim 1, wherein the first SBI service request comprises a subsequent SBI request including a 3gpp-Sbi-Target-apiRoot header identifying one of the N producer NF instances and a routing binding indication identifying an NF set of which the N and (N+1) th producer NF instances are members.

3. The method of claim 2, wherein performing alternate routing of the first SBI request includes selecting the (N+1) th producer NF instance from the NF set.

4. The method of claim 1, wherein detecting an error involving the N producer NF instances includes receiving an error response from at least one of the N producer NF instances.

5. The method of claim 1, wherein detecting an error regarding the N producer NF instances includes detecting a response timeout at the SCP for at least one of the N producer NF instances.

6. The method of claim 1, wherein propagating the error information with the success response message includes adding a custom header including the error information to the success response message.

7. The method of claim 1, wherein the error information includes information identifying each of the N producer NF instances.

8. The method of claim 1, wherein the error information includes a hypertext transfer protocol (HTTP) status code generated by at least one of the N producer NF instances and transmitted to the SCP in response to the first SBI request message.

9. The method of claim 1, comprising using, by the consumer NF, the error information to implement the circuit breaker design pattern.

10. The method of claim 9, wherein using the error information to implement the circuit breaker design pattern includes selecting, in a manner that excludes each of the N producer NF instances, the (N+1) th producer NF instance as a target for a second SBI service request, generating the second SBI service request including a 3gpp-Sbi-Target-apiRoot header identifying the (N+1) th producer NF instance, and transmitting the second SBI service request to the SCP.

11. A system for error information propagation from a service communication proxy (SCP) to a consumer network function (NF) to support a circuit breaker design at the consumer NF, the system comprising:
    an SCP including at least one processor; and
    an error detector/propagator implemented by the at least one processor for receiving, from the consumer NF, a first service based interface (SBI) service request message, attempting, by the SCP, to forward the first SBI service request to N producer NF instances, N being an integer at least one, detecting an error involving the N producer NF instances, performing successful alternate routing of the first SBI service request message to an (N+1) th producer NF instance, receiving a success response message from the (N+1) th producer NF instance, and propagating, with the success response message and to the consumer NF, error information regarding the N producer NF instances.

12. The system of claim 11, wherein the first SBI service request comprises a subsequent SBI request including a 3gpp-Sbi-Target-apiRoot header identifying one of the N producer NF instances and a routing binding indication identifying an NF set of which the N and (N+1) th producer NF instances are members.

13. The system of claim 12, wherein the error detector/propagator is configured to perform alternate routing of the first SBI request by selecting the (N+1) th producer NF instance from the NF set.

14. The system of claim 11, wherein the error detector/propagator is configured to detect the error involving the N producer NF instances by receiving an error response from at least one of the N producer NF instances.

15. The system of claim 11, wherein the error detector/propagator is configured to detect the error involving the N producer NF instances by detecting a response timeout at the SCP for at least one of the N producer NF instances.

16. The system of claim 11, wherein the error detector/propagator is configured to propagate the error information with the success response message by adding a custom header including the error information to the success response message.

17. The system of claim 11, wherein the error information includes information identifying each of the N producer NF instances.

18. The system of claim 11, wherein the error information includes a hypertext transfer protocol (HTTP) status code generated by at least one of the N producer NF instances and transmitted to the SCP in response to the first SBI request message.

19. The system of claim 11, wherein the error information is usable by the consumer NF to implement the circuit breaker design pattern.

20. A non-transitory computer readable medium having stored thereon executable instructions that when executed by a processor of a computer control the computer to perform steps comprising:
- receiving, at a service communication proxy (SCP) and from a consumer network function (NF), a first service based interface (SBI) service request message;
- attempting, by the SCP, to forward the first SBI service request to N producer NF instances, N being an integer of at least one;
- detecting, by the SCP, an error involving the N producer NF instances;
- performing, by the SCP, successful alternate routing of the first SBI service request message to an (N+1) th producer NF instance;
- receiving, by the SCP, a success response message from the (N+1) th producer NF instance; and
- propagating, by the SCP, with the success response message and to the consumer NF, error information regarding the N producer NF instances.

* * * * *

UNITED STATES PATENT AND TRADEMARK OFFICE
CERTIFICATE OF CORRECTION

| | |
|---|---|
| PATENT NO. | : 12,245,056 B2 |
| APPLICATION NO. | : 17/706557 |
| DATED | : March 4, 2025 |
| INVENTOR(S) | : Rajput et al. |

It is certified that error appears in the above-identified patent and that said Letters Patent is hereby corrected as shown below:

On the Title Page

Column 2, under abstract, Line 10, delete "(N+1) th" and insert -- (N+1)th --, therefor.

Column 2, under abstract, Line 12, delete "(N+1) th" and insert -- (N+1)th --, therefor.

In the Specification

In Column 4, Line 3, delete "messsage" and insert -- message --, therefor.

In Column 4, Line 65, delete "(N+1) th" and insert -- (N+1)th --, therefor.

In Column 4, Line 67, delete "(N+1) th" and insert -- (N+1)th --, therefor.

In the Claims

In Column 13, Line 44, in Claim 1, delete "(N+1) th" and insert -- (N+1)th --, therefor.

In Column 13, Line 47, in Claim 1, delete "(N+1) th" and insert -- (N+1)th --, therefor.

In Column 13, Line 55, in Claim 2, delete "(N+1) th" and insert -- (N+1)th --, therefor.

In Column 13, Lines 58-59, in Claim 3, delete "(N+1) th" and insert -- (N+1)th --, therefor.

In Column 14, Line 20, in Claim 10, delete "(N+1) th" and insert -- (N+1)th --, therefor.

In Column 14, Line 23, in Claim 10, delete "(N+1) th" and insert -- (N+1)th --, therefor.

In Column 14, Line 40, in Claim 11, delete "(N+1) th" and insert -- (N+1)th --, therefor.

Signed and Sealed this
Third Day of June, 2025

Coke Morgan Stewart
*Acting Director of the United States Patent and Trademark Office*

CERTIFICATE OF CORRECTION (continued)
U.S. Pat. No. 12,245,056 B2

In Column 14, Line 41, in Claim 11, delete "(N+1) th" and insert -- (N+1)th --, therefor.

In Column 14, Line 49, in Claim 12, delete "(N+1) th" and insert -- (N+1)th --, therefor.

In Column 14, Line 53, in Claim 13, delete "(N+1) th" and insert -- (N+1)th --, therefor.

In Column 15, Line 25, in Claim 20, delete "(N+1) th" and insert -- (N+1)th --, therefor.

In Column 15, Line 28, in Claim 20, delete "(N+1) th" and insert -- (N+1)th --, therefor.